United States Patent [19]

Kaku et al.

[11] Patent Number: 5,570,390
[45] Date of Patent: Oct. 29, 1996

[54] TIMING GENERATION DEVICE AND DATA TRANSMISSION DEVICE HAVING THE TIMING GENERATION DEVICE

[75] Inventors: Takashi Kaku; Kyoko Hirao, both of Kawasaki, Japan

[73] Assignee: Fujitsu Limited, Kanagawa, Japan

[21] Appl. No.: 9,103

[22] Filed: Jan. 26, 1993

[30] Foreign Application Priority Data

Jan. 27, 1992 [JP] Japan ................................. 4-012010

[51] Int. Cl.⁶ ............................................. H04B 3/06
[52] U.S. Cl. ....................... 375/222; 375/344; 375/371; 375/260; 370/69.1; 370/100.1
[58] Field of Search ................................ 375/222, 260, 375/344, 345, 355, 364, 371, 373, 376; 370/69.1, 74, 76, 98, 100.1, 110.1; 379/93

[56] References Cited

U.S. PATENT DOCUMENTS

| | | | |
|---|---|---|---|
| 3,990,046 | 11/1976 | Katz et al. | 375/222 |
| 4,312,075 | 1/1982 | Murano et al. | 375/354 |
| 4,694,469 | 9/1987 | Kaku et al. | 375/231 |
| 4,860,308 | 8/1989 | Kamerman et al. | 375/222 |

FOREIGN PATENT DOCUMENTS

| | | |
|---|---|---|
| 0204308 | 12/1986 | European Pat. Off. ............... 375/222 |
| 0273080 | 7/1988 | European Pat. Off. . |
| 0324570 | 7/1989 | European Pat. Off. . |
| 0324571 | 7/1989 | European Pat. Off. . |
| 61-82545 | 4/1986 | Japan . |

Primary Examiner—Young T. Tse

[57] ABSTRACT

In a timing generation device coupled to a transmission line having a main channel and a secondary channel, the main channel having a transmission speed higher than that of the secondary channel, a first unit extracts a timing signal component transmitted via the secondary channel. A second unit generates an internal timing signal in synchronism with the timing signal component, the internal timing signal being used to reproduce data transmitted via the main channel.

17 Claims, 14 Drawing Sheets

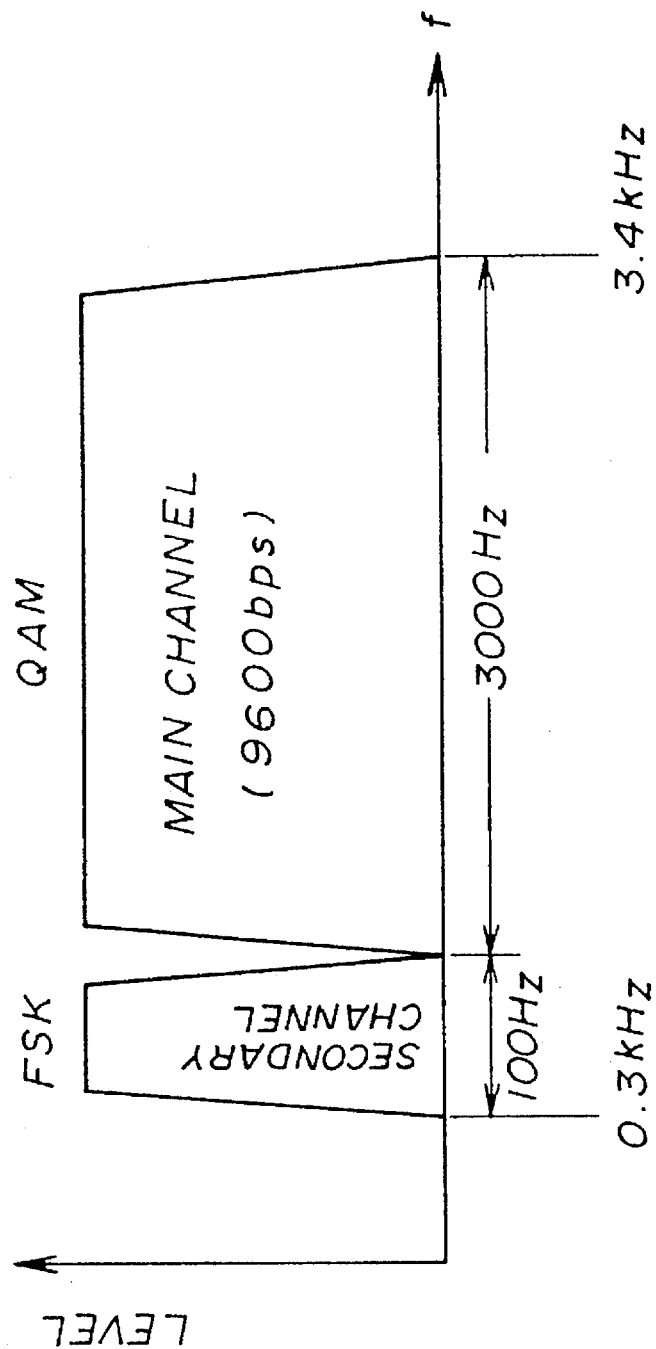
FIG. IA PRIOR ART

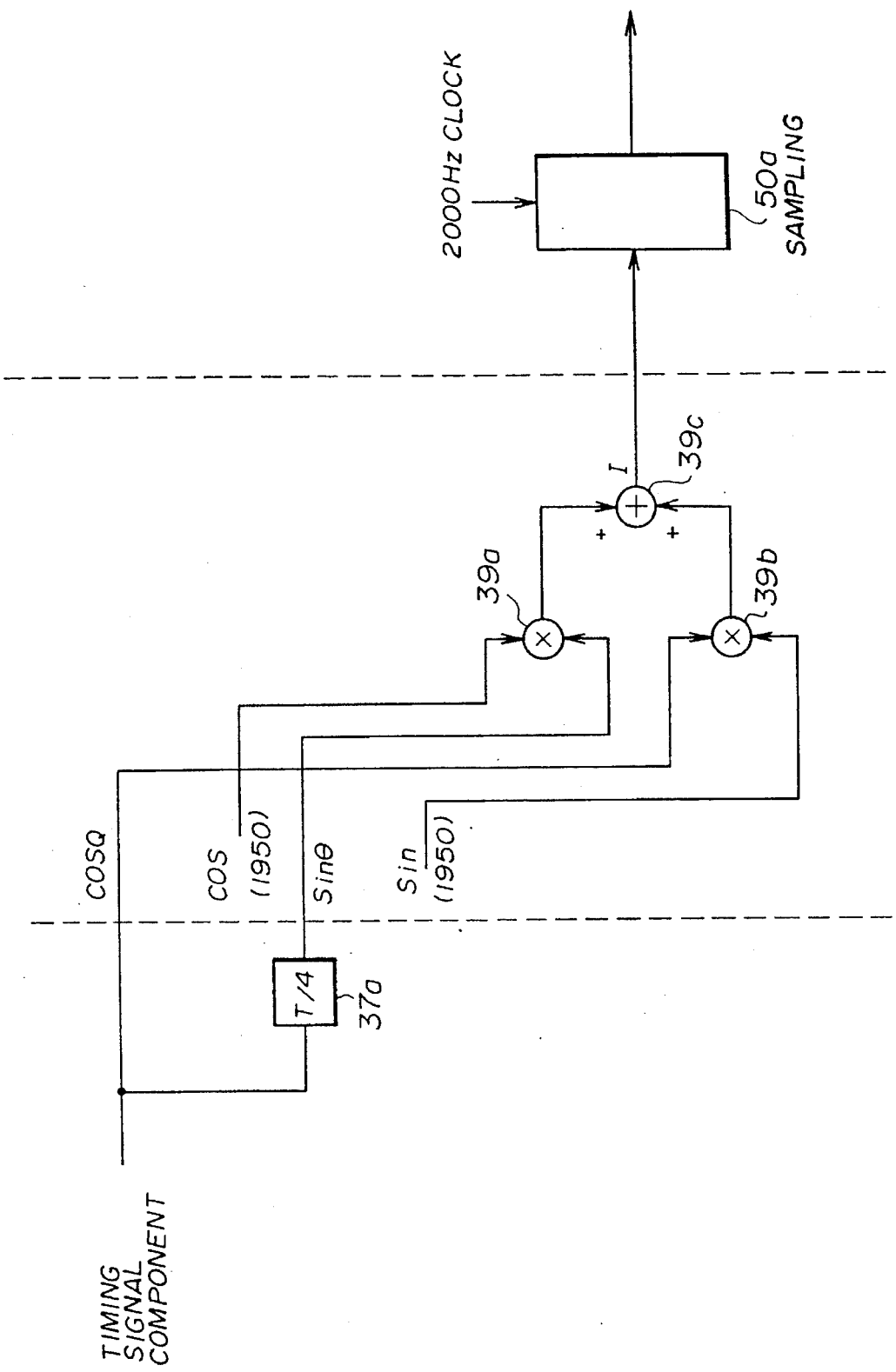

8000Hz

2000Hz

ADVANCE
DELAY

TIMING SIGNAL (50Hz)

ZERO-POINT EXTRACTION AFTER MULTIPLICATION BY-50Hz

SAMPLING CLOCK (2000Hz)

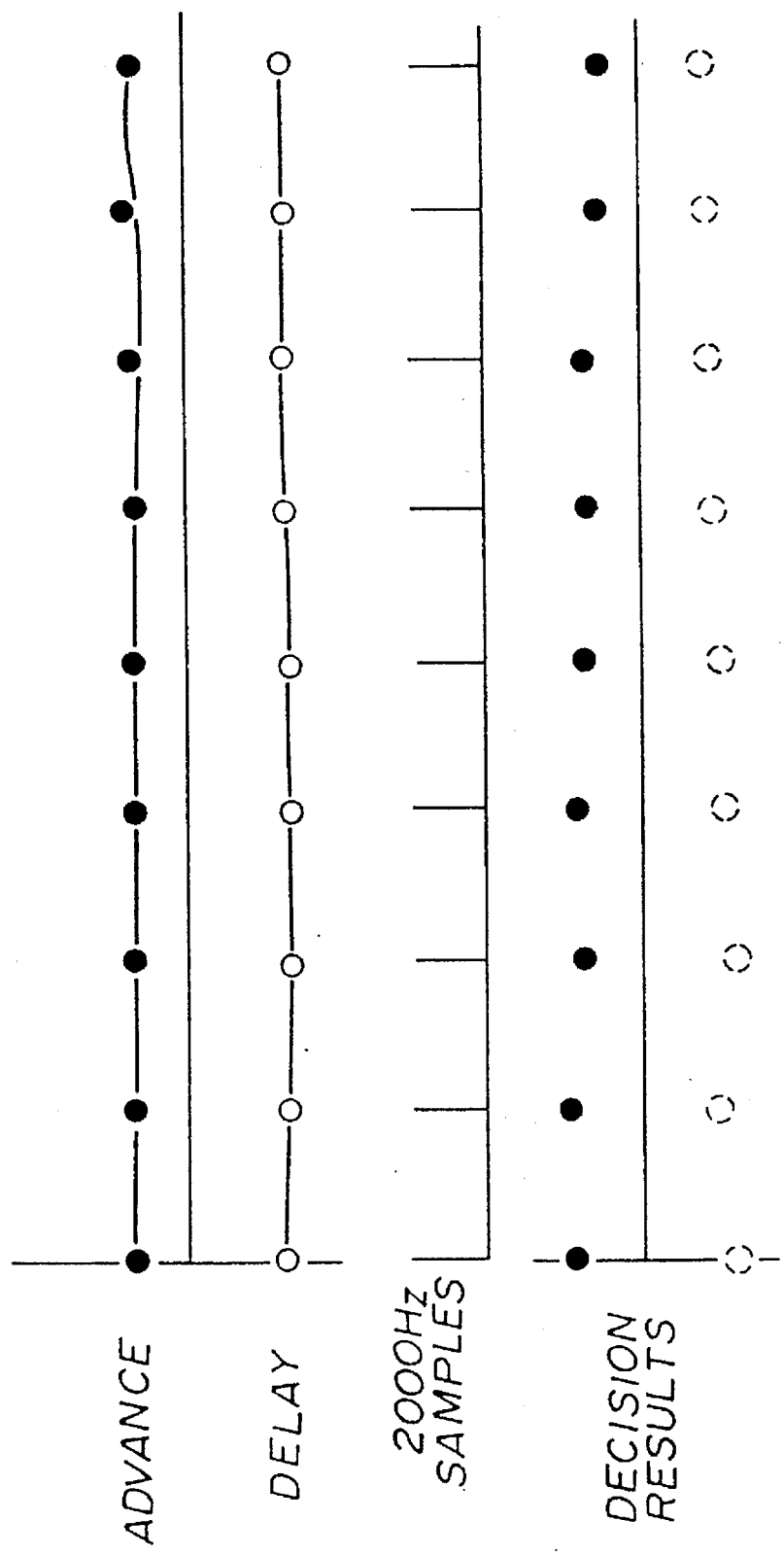

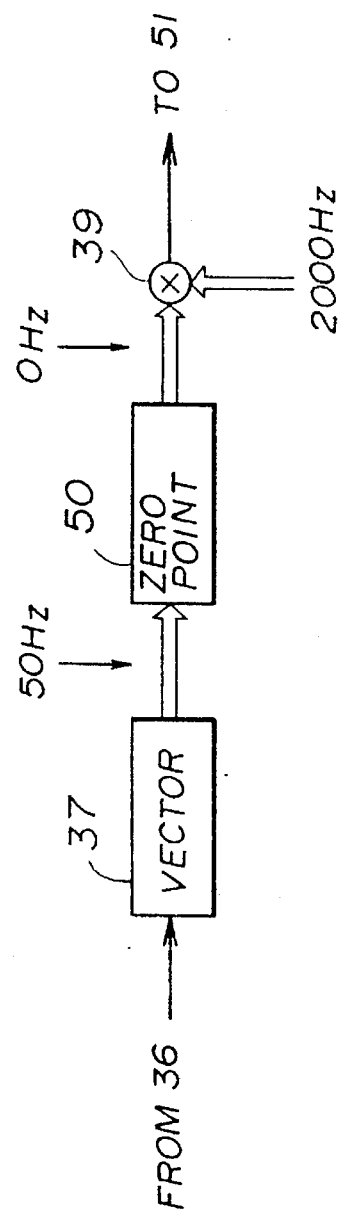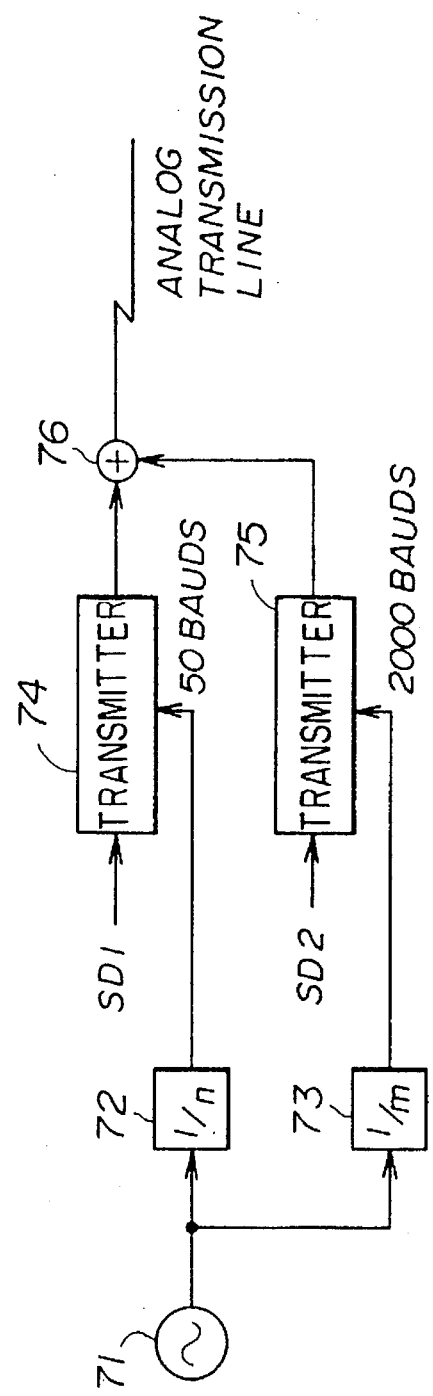

TIMING GENERATION DEVICE AND DATA TRANSMISSION DEVICE HAVING THE TIMING GENERATION DEVICE

BACKGROUND OF THE INVENTION

1. Field of the Invention

The present invention generally relates to a timing generation device that generates a timing signal from a signal received via a transmission line. More particularly, the present invention is concerned with a timing generation device suitable for a data transmission device which demodulates a received signal transmitted via a high-bit-rate main (primary) channel and a low-bit-rate secondary channel having a frequency band different from that of the high-bit-rate main channel.

2. Description of the Prior Art

A data transmission device, such as a modem (modulator and demodulator), regenerates a transmission tinning signal from a signal received via a transmission line. The transmission timing signal is used to reproduce the original transmission signal from the received signal.

Recently, it has been required that data be transmitted via an analog transmission line having the voice band at a high transmission speed (bit rate). As the transmission speed increases, it becomes difficult to extract a timing component from the received signal. Hence, it is desired to easily extract the timing component from the signal received via the analog transmission line at a high transmission speed.

As shown in FIG. 1A, a signal transmitted via an analog transmission line has a main (primary) channel and a secondary channel which are arranged in the voice band between 0.3 kHz and 3.4 kHz. The main channel has a frequency band of 3000 Hz, and the secondary channel has a frequency band of 100 Hz. Main data modulated by a QAM (Quadrature Amplitude Modulation) process at a transmission speed of 9600 bps is transmitted via the main channel. Control data used to manage the network is modulated by a FSK (Frequency Shift Keying) process and transmitted via the secondary channel. For example, control data necessary to notify a host communications device of the status of the modem or to test the network is transmitted via the secondary channel. The control data is transmitted at a transmission speed of, for example, 50 bps.

FIG. 1B is a block diagram of a receiver of a modem which handles a signal transmitted via the main and secondary channels (see Japanese Laid-Open Patent Publication No. 61-82545). An analog signal received via an analog transmission line (not shown) is applied to a low-pass filter (LPF) 40, which eliminates high-frequency components therefrom. The analog signal from the low-pass filter 40 is applied to an A/D (Analog-to-Digital) converter 41. A digital signal generated from the A/D converter 41 is applied to a processor 1, such as a digital signal processor (DSP).

The processor 1 is made up of a main channel system 2 and a secondary channel system 3. In the main channel system 2, the digital signal from the A/D converter 41 is demodulated by a demodulator (DEM) 20. A roll-off filter (ROF) 21 eliminates high-frequency components from the demodulated signal, and shapes the waveform of the demodulated signal. An equalizer (EQL) 22 equalizes the waveform of the output signal of the roll-off filter 21. A carrier phase controller (ACPC) 23 eliminates jitter from the equalized signal from the equalizer 22. A decision unit (DEC) 24 identifies data transmitted via the main channel from the output signal of the carrier phase controller 23.

The output signal of the roll-off filter 21 is applied to a timing extractor (TIM) 25, which extracts a timing component from the output signal of the roll-off filter 21. A primary integration circuit 26, which is made up of a delay element having a unit delay time T and two adders, executes a frequency integration operation on the output signal of the timing extractor 25 in order to stabilize the frequency components affected by the jitter. A secondary integration circuit 27, which is made up of a delay element having the unit delay time T and an adder, executes a phase integration operation on the output signal of the primary integration circuit 26 in order to stabilize a phase error signal component contained in the output signal of the primary integration circuit 26. A decision unit (DEC) 28 identifies phase error and outputs a phase error signal to a 1/n counter 29. The frequency dividing ratio of the 1/n counter 29 is changed in accordance with the phase error signal. That is, the structural elements 26–29 form a phase-locked loop (PLL) circuit. The output signal of the 1n counter 29 is applied, as an internal timing signal, to the A/D converter 41, which uses the internal timing signal as a sampling clock signal.

In the secondary channel system 3, a demodulator (DEM) 30 demodulates the digital signal from the A/D converter 41. A roll-off filter (ROF) 31 eliminates high-frequency components from the demodulated signal from the demodulator 30, and shapes the waveform thereof. An equalizer (EQL) 32 equalizes the waveform of the output signal of the roll-off filter 31. A carrier phase controller (ACPC) 33 eliminates jitter from the equalized signal from the equalizer 32. A decision unit (DEC) 34 identifies data transmitted via the secondary channel from the output signal of the carrier phase controller 33.

In practice, the above-mentioned structural elements of the processor 1 correspond to processes executed by the processor 1.

However, the conventional device shown in FIG. 1B has the following disadvantages. As shown in FIG. 2A, when the roll-off rate of the roll-off filter 21 is high (100% in FIG. 2A), the transmission speed is slow and is, for example, 1000 bauds. However, in this case, timing extraction can be easily performed. The roll-off rate of the roll-off filter 21 is defined as shown in FIG. 2C.

When the transmission speed of the main channel is increased to 2000 bauds in order to satisfy the recent requirement of high bit-rate data transmission, it is necessary to reduce the roll-off rate as shown in FIG. 2B in order to transfer data via the main channel in the voice band. In the case shown in FIG. 2B, it is very difficult to extract the timing component from the signal transmitted via the main channel because the timing component is extracted from energy existing in areas indicated by hatching in FIG. 2B. That is, extraction of the timing component becomes difficult as the transmission speed of the main channel increases. In the case shown in FIG. 2B, the PLL circuit does not accurately operate, and the transmission device erroneously may reproduce the original transmission data.

SUMMARY OF THE INVENTION

It is a general object of the present invention to provide a timing generation device in which the above disadvantages are eliminated.

A more specific object of the present invention is to provide a timing generation device capable of accurately extracting timing information in the case where the main channel has a high-transmission speed.

The above objects of the present invention are achieved by a timing generation device coupled to a transmission line having a main channel and a secondary channel, the main channel having a transmission speed higher than that of the secondary channel, the timing generation device comprising: first means for extracting a timing signal component transmitted via the secondary channel; and second means, coupled to the first means, for generating an internal timing signal in synchronism with the timing signal component, the internal timing signal being used to reproduce data transmitted via the main channel.

Another object of the present invention is to provide a data transmission device having the above-mentioned timing generation device.

This object of the present invention is achieved by a data transmission device coupled to a transmission line having a main channel and a secondary channel, the main channel having a transmission speed higher than that of the secondary channel, the data transmission device comprising: A/D conversion means for converting an analog signal received via the transmission line into a digital signal at a variable sampling frequency; a main channel system which is connected to the A/D conversion means and reproduces transmission data transmitted via the main channel from the digital signal; a secondary channel system which is connected to the A/D conversion means and reproduces control data transferred via the secondary channel from the digital signal; and a timing extraction device comprising having the above-mentioned structure. More specifically, the timing extraction device comprises: first means for extracting a timing signal component transmitted via the secondary channel; and second means, coupled to the first means, for generating an internal timing signal in synchronism with the timing signal component, the internal timing signal being applied to the A/D conversion means in order to control the variable sampling frequency.

BRIEF DESCRIPTION OF THE DRAWINGS

Other objects, features and advantages of the present invention will become more apparent from the following detailed description when read in conjunction with the accompanying drawings, in which:

FIG. 1A is a frequency band diagram of a signal transmitted via an analog transmission line having the voice band;

FIG. 5 is a block diagram of a vector conversion unit, a multiplier and a zero-point extractor shown in FIG. 4;

FIGS. 12 and 13 are diagrams showing the operation of the second embodiment of the present invention;

FIG. 14 is a block diagram of a variation of the first embodiment of the present invention; and FIG. 15 is a block diagram of an essential part of a host device to which a data transmission device is coupled via a network.

DESCRIPTION OF THE PREFERRED EMBODIMENTS

Figure 3:
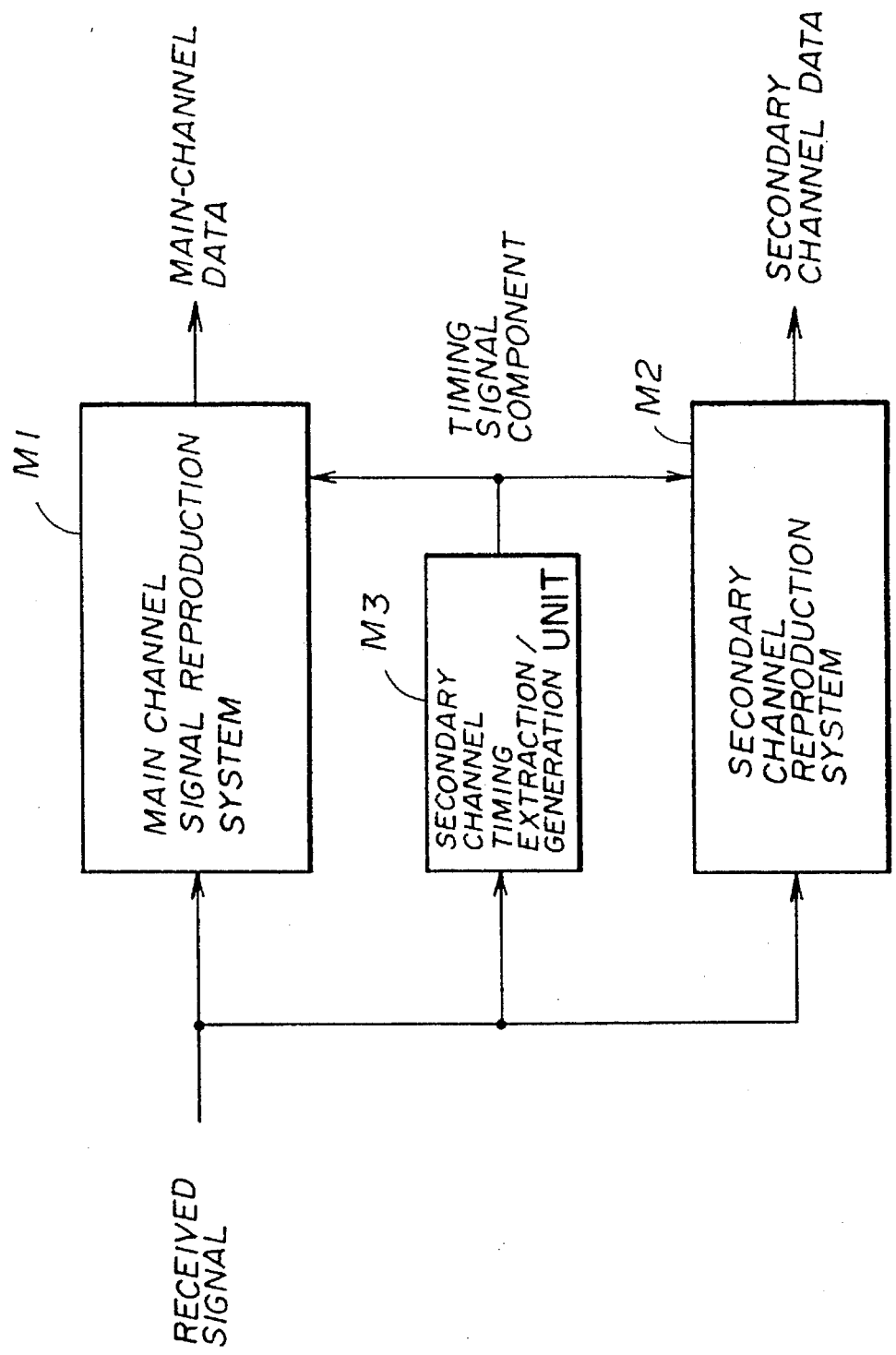
FIG. 3 is a block diagram of an overview of the present invention.

FIG. 3 shows an overview of the present invention. A secondary channel timing extraction/generation unit M3 extracts a timing signal component from a signal transmitted via the secondary channel, and generates a timing signal synchronized with the timing component. The timing signal thus generated is applied to a main channel signal reproduction system M1 reproducing main-channel data and a secondary channel signal reproduction system M2 reproducing secondary-channel data. On the transmitter side, the timing component having a transmission speed of, for example, 50 bauds is generated and transmitted via the secondary channel. It is necessary for the transmission speed of the main channel to be an integer multiple of the transmission speed of the secondary channel. This is because the timing signal is extracted from the signal transmitted via the secondary channel.

Since the timing component is extracted from the signal transmitted via the secondary channel, it is possible to increase the transmission speed of the main channel to, for example, 2000 bauds. Hence, a strict jitter tolerance is not required for the main channel signal reproduction system M1.

Figure 1B:
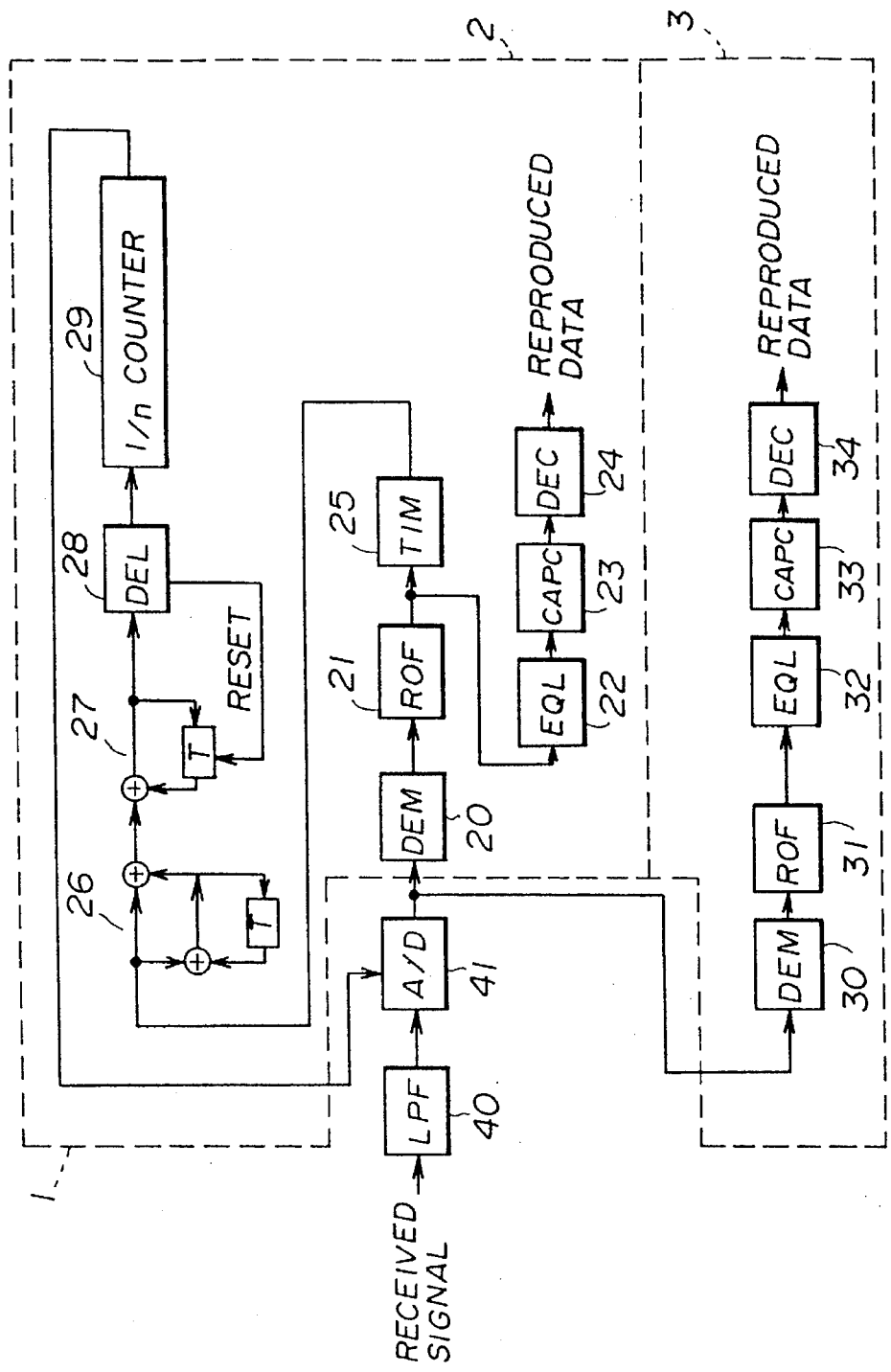
FIG. 1B is a block diagram of a conventional data transmission device that handles signals as shown in FIG. 1A.
Figure 2A:
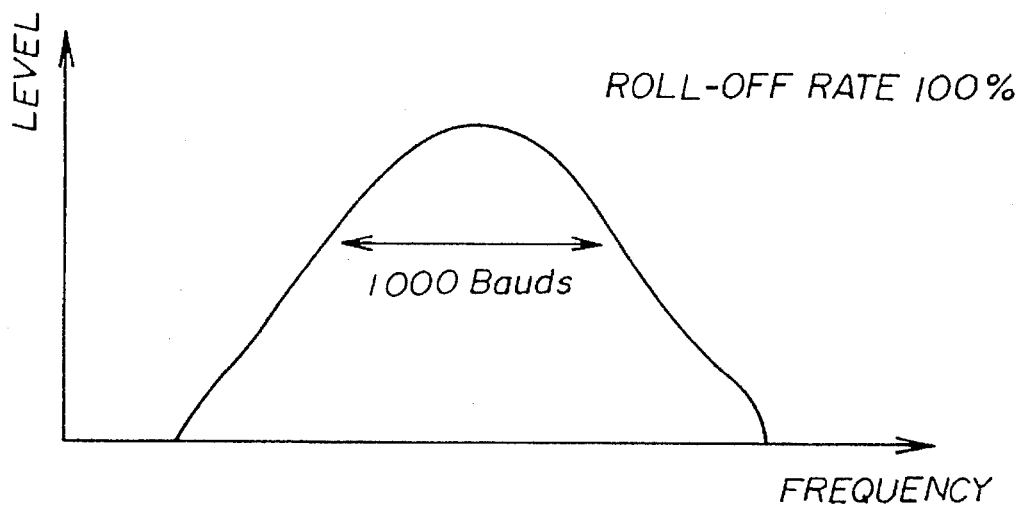
FIGS. 2A, 2B and 2C are frequency band diagrams illustrating disadvantages encountering in timing extraction executed in the data transmission device shown in FIG. 1B.
Figure 2B:
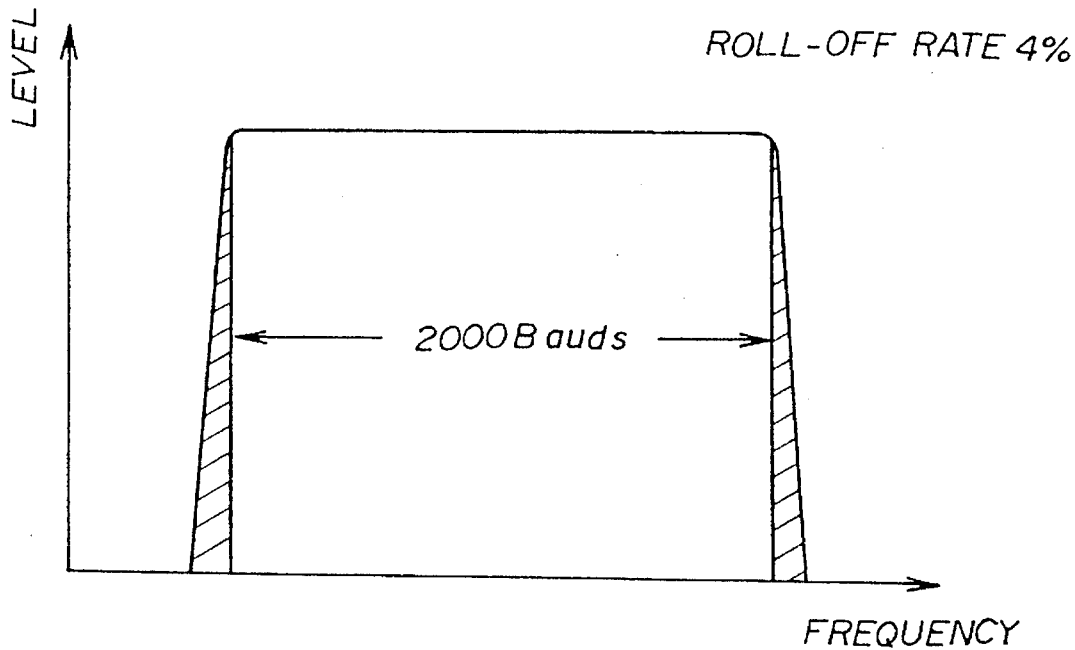
Figure 2C:
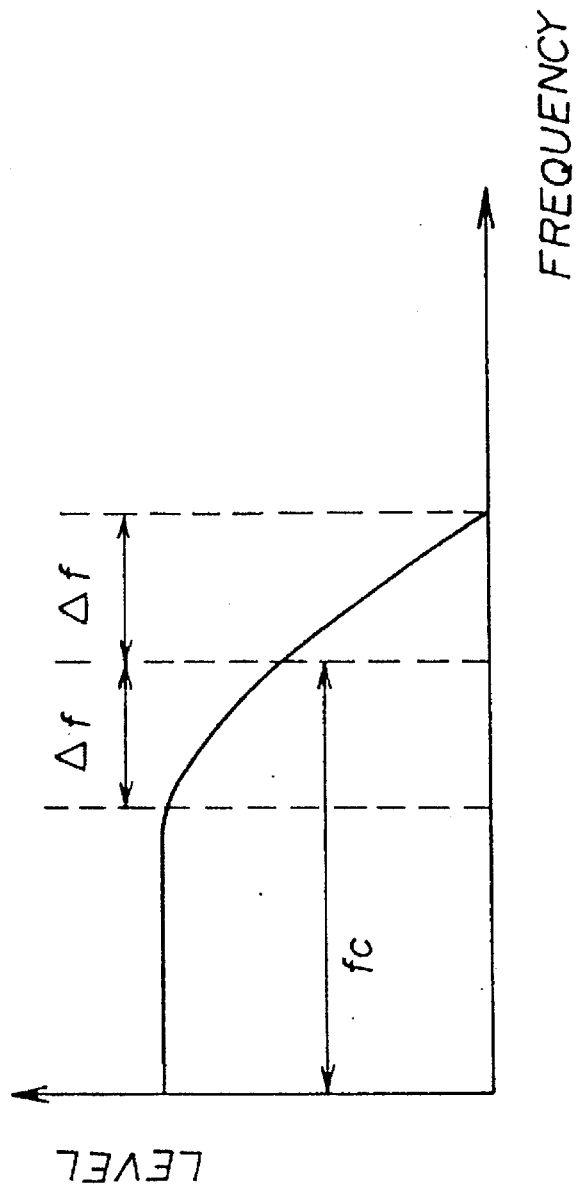
Figure 4:
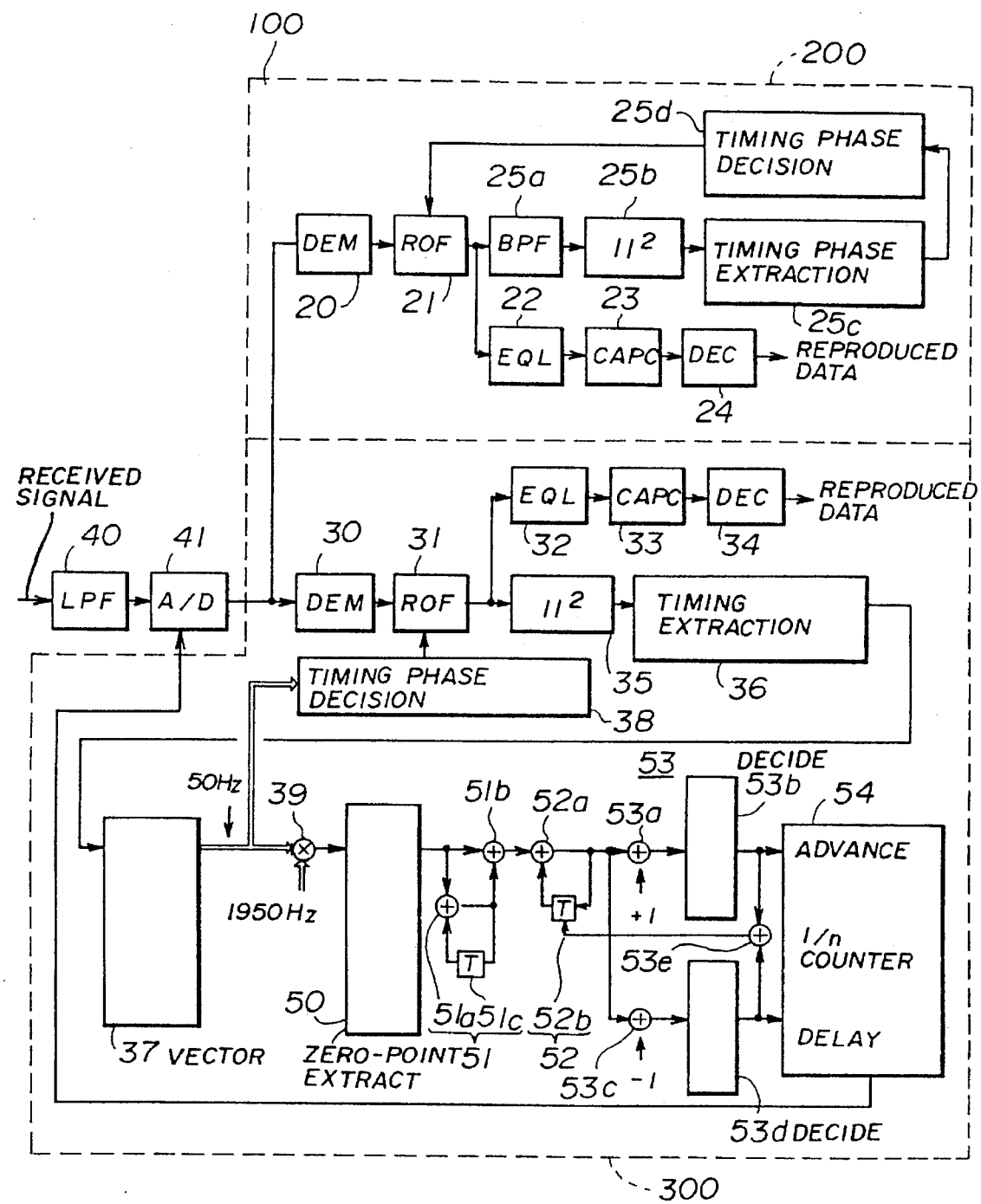
FIG. 4 is a block diagram of a first embodiment of the present invention.

FIG. 4 shows a first embodiment of the present invention. In FIG. 4, parts that are the same as parts shown in the previously described figures are given the same reference numbers. A data transmission device shown in FIG. 4 comprises the low-pass filter 40, the A/D converter 41 and a processor 100, such as a digital signal processor. The processor 100 has a main channel system 200 including a main channel signal reproducing system corresponding to the unit M1 shown in FIG. 3 and having a demodulator (DEM) 20, roll-off filter 21, equalizer (EQL), a carrier phase controller 23 and decision unit (DEC) 24 (as described in connection with FIG. 1B) and a secondary channel system 300 which includes a secondary channel reproduction system which corresponds to the unit M2 of FIG. 3 and is formed of elements 30–34 (described in connection with FIG. 1B), and also incorporates a secondary channel timing extraction/generation unit corresponding to unit M3 of FIG. 3 and formed of elements 35–54, as will be explained in detail below. The main channel system 200 and the secondary channel system 300 each has respective timing signal extracting means.

In the main channel system 200, a band-pass filter 25a connected to the roll-off filter 21 extracts signal components in a band including the timing component from the output signal of the roll-off filter 21. A square multiplier 25b squares the output signal of the band-pass filter 25a to thereby extract energy of the timing signal. A timing phase extractor 25c extracts a timing phase signal from the output signal of the square multiplier 25b. A timing phase decision unit 25d identifies the timing phase from the timing phase signal received from the timing phase extractor 25c, and generates a control signal based on the identified timing phase. The control signal is applied to the roll-off filter 21 in order to vary tap coefficients of the roll-off filter 21.

In the secondary channel system 300, a square multiplier 35 connected to the roll-off filter 31 squares the output signal of the roll-off filter 31 to thereby extract energy of the signal in the secondary channel. A timing extractor 36 extracts energy of the timing signal component from the output signal of the square multiplier 35. A vector conversion unit 37 generates a vector signal from the timing signal component from the timing extractor 36, which is a scaler signal. A timing phase decision unit 38 identifies the phase of the extracted timing signal component and generates a control signal based on the identified phase. The control signal is applied to the roll-off filter 31 in order to change the tap coefficients of the roll-off filter 31.

A multiplier 39 multiplies the timing signal (vector) having a frequency of 50 Hz by a reference signal (vector) having a frequency 1950 Hz, and also has an adder part, as will be explained in connection with FIG. 5, to generate a timing signal having a frequency of 2000 Hz. A zero-point extractor 50 samples the timing signal from the multiplier 39 at a baud-rate clock signal (2000 Hz), and thereby generates phase error signal samples.

A primary integration circuit 51 executes a frequency integration operation on a series of samples from the zero-point extractor 50, and includes two adders 51a and 51b and a delay element 51c having the unit delay time. The adder 51a adds the current sample to the previous sample prior to the current sample by the unit delay time T. The adder 51b adds the current sample to the output signal of the adder 51a. The first integration circuit 51 functions to stabilize the frequency components affected by jitter. A secondary integration circuit 52 includes an adder 52a and a delay element 52b having the unit delay time T. The adder 52a adds the current sample from the circuit 51 to the previous sample from the delay element 52b.

A decision unit 53 includes adders 53a, 53c and 53e, and polarity decision units 53b and 53d. The adder 53a adds "1" to the output signal of the secondary integration circuit 52. The polarity decision unit 53b determines whether or not the output signal from the adder 53a advances by determining whether or not the polarity of the output signal from the adder 53a is positive. The decision result is added to the adder 53e. The adder 53c adds "–1" to the output signal of the secondary integration circuit 52. The polarity decision unit 53d determines whether or not the output signal from the adder 53c delays by determining whether or not the polarity of the output signal from the adder 53c is negative. The decision result is added to the adder 53e. The output signal of the adder 53e is applied to the delay element 52b in order to reset the value of the tap T. A 1/n counter 54 has a variable frequency dividing ratio, and receives the decision results from the polarity decision units 53b and 53d. When the decision result from the polarity decision unit 53b shows that the phase of the timing signal advances, the frequency dividing ratio decreases to decrease the frequency. When the decision result from the polarity decision unit 53d shows that the phase of the timing signal delays, the frequency dividing ratio increases to increase the frequency. The output signal of the 1/n counter 54 serves as an internal timing signal, which is applied to the A/D converter 41, which samples the analog signal at the frequency of the internal timing signal.

FIG. 5 shows the vector conversion unit 37, the multiplier 39 and the zero-point extractor 50. The vector conversion unit 37 includes a T/4 delay unit 37a, which delays the timing component (a cos θ component) from the timing extractor 36 by T/4 where T is the unit delay time. Hence, the output signal of the T/4 delay unit 37a is a cos θ component.

As has been described previously, the multiplier 39 multiplies the vector signal by 1950 Hz, that is, (sin θ+j cos θ)×(sin 1950+j cos 1950)=sin θ·sin 1950–cos θ·cos 1950)+ j(sin θ·cos 1950+cos θ·sin 1950). In practice, either the real component or the imaginary component can be used for timing extraction. Hence, as shown in FIG. 5, the multiplier 39 is designed to handle the imaginary component I, and therefore comprises multipliers 39a and 39b and an adder 39c. More particularly, the multiplier 39a calculates sin θ·cos 1950, and the multiplier 39b calculates cos θ·sin 1950. The adder 39c adds the output signals of the multipliers 39a and 39b to each other.

The zero-point extractor 50 includes a sampling circuit 50a, which samples the output signal of the adder 39c at a baud rate clock of 2000 Hz.

Figure 6A:
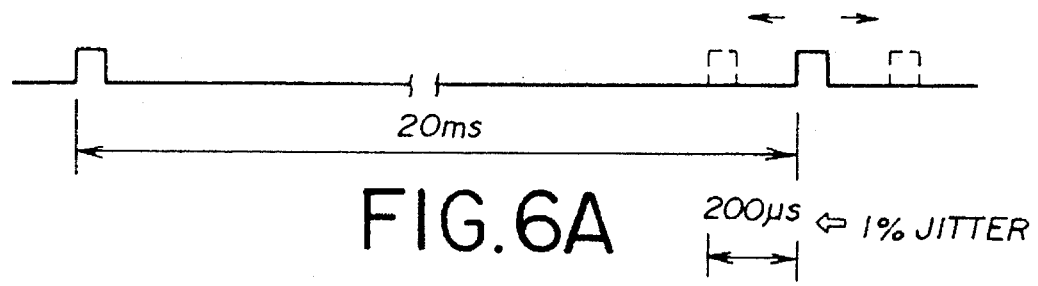
FIGS. 6 and 7 are waveform diagrams showing a vector conversion process and a zero-cross extracting process executed in the first embodiment of the present invention.
Figure 6B:
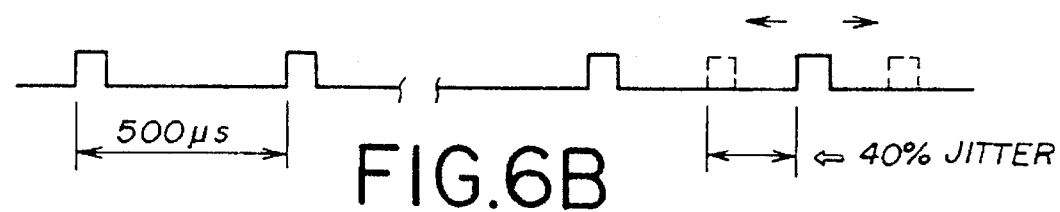

A description will now be given of the operation of the first embodiment of the present invention. It will now be assumed that the main channel has a transmission speed of 2000 bauds ((B) of FIG. 6), the secondary channel has a transmission speed of 50 bauds ((A) of FIG. 6), and the sampling clock signal has a frequency of 8000 Hz.

The signal received via the analog transmission line passes through the low-pass filter 40, and is sampled at the sampling clock signal having a frequency of 8000 Hz. The digital signal passes through the demodulator 30 and the roll-off filter 31. When the roll-off rate is 100%, the timing component can be accurately extracted from the output signal of the demodulator 30. The output signal of the roll-off filter 31 passes through the equalizer 32, the carrier phase controller 33 and the decision unit 34. The decision unit 34 reproduces the original transmission data having a transmission speed of 50 bauds.

Figure 7A:
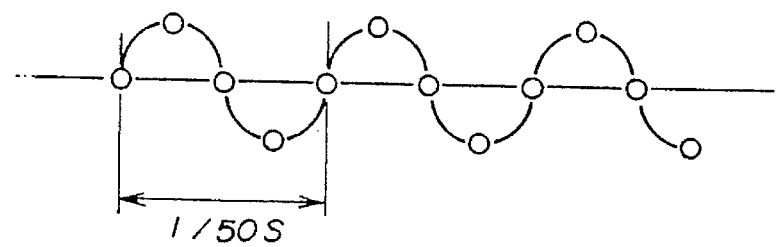
Figure 7B:
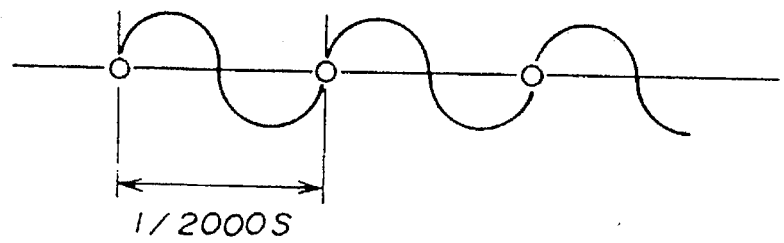
Figure 7C:
Figure 8A:
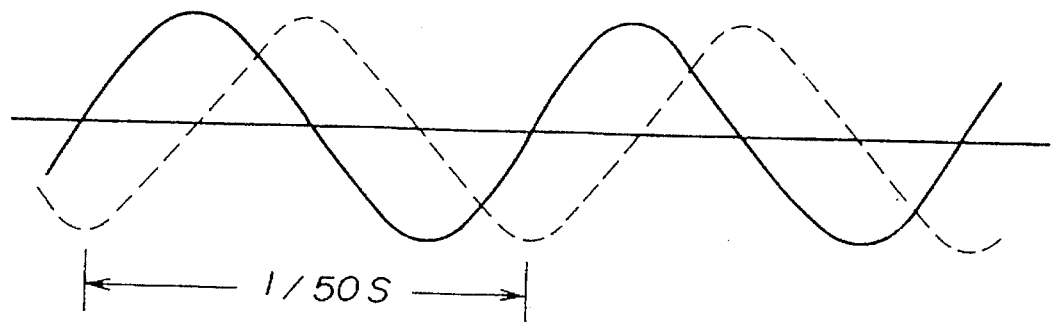
FIGS. 8A, 8B and 8C are diagrams showing a frequency shifting operation executed in the first embodiment of the present invention.

The output signal of the roll-off filter 31 is squared by the square multiplier 35 to thereby generate the energy of the timing component. The timing extractor 36 extracts the timing component, as shown in (A) of FIG. 7 or FIG. 8A. The timing component is a 50 Hz signal, and one period thereof is 20 ms (=1/50 sec). In FIG. 8A, two timing components are illustrated.

Figure 8B:
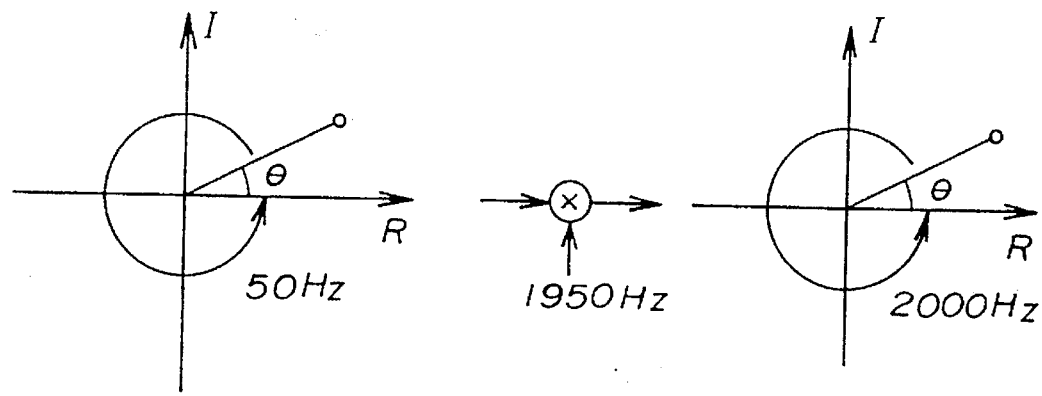
Figure 8C:
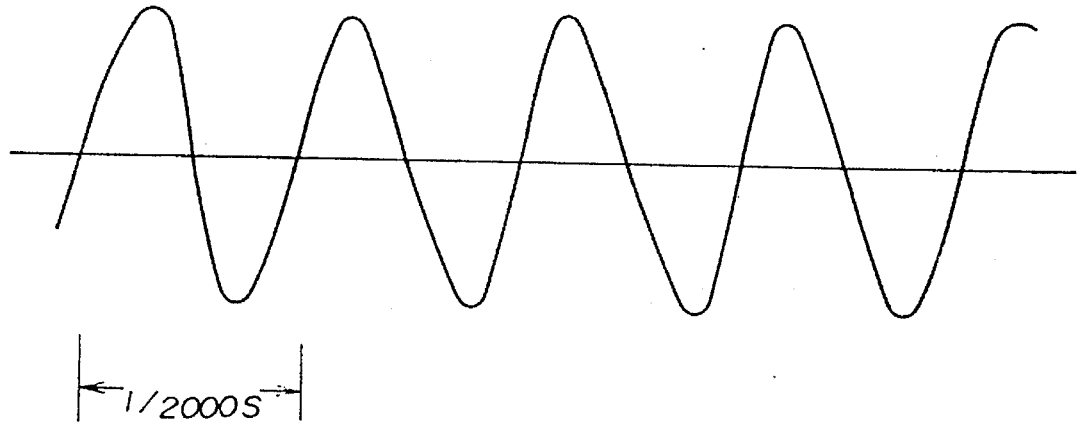
Figure 9A:
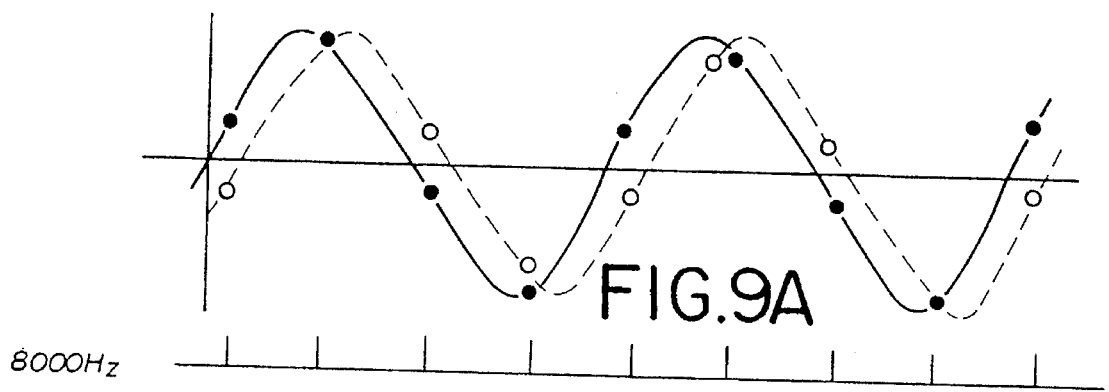
FIG. 9 is a diagram showing a decision process for determining whether or not the timing signal advances or delays.
Figure 9B:
Figure 9C:
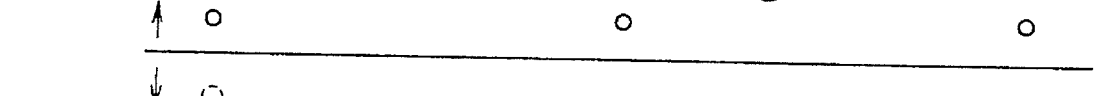
Figure 9D:

A 1% jitter contained in the 50 Hz timing component corresponds to a 40% jitter in the main channel because the main channel has a transmission speed of 2000 bauds and one period thereof is 500 μs. In order to make a 1% jitter in the 50 Hz timing component appear as a 1% jitter in the main channel, the frequency of the 50 Hz timing component is shifted to the transmission speed of the main channel. For this purpose, as shown in FIG. 8B, the timing component which is a scaler signal from the timing extractor 36 is converted into a vector signal by the vector conversion unit 37, and is multiplied by the 1950 Hz signal by the multiplier 39. In this manner, the timing signal of a frequency of 2000 Hz as shown in FIG. 8C is generated by the multiplier 39.

In practice, the 2000 Hz timing signal consists of samples obtained by sampling at a sampling frequency of 8000 Hz, as shown in (A) and (B) of FIG. 9. That is, samples indicated by dots are output from the multiplier 39. The zero-point extractor 50 extracts the samples at a sampling frequency of 2000 Hz shown in (C) of FIG. 9. In this manner, a phase error indicating whether the timing signal advances or delays can be obtained for each period of the 2000 Hz sampling clock, as shown in (D) of FIG. 9.

The phase error in the timing signal is subjected to the frequency integration operation by the primary integration circuit 51. The secondary integration circuit 52 executes the phase integration operation on the output signal of the primary integration circuit 51. The output signal of the secondary integration circuit 52 is applied to the decision unit 53.

Figure 10:
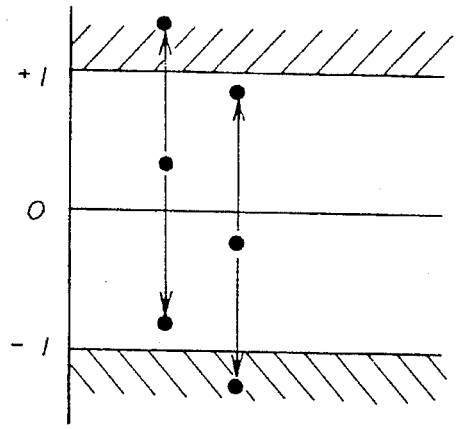
FIG. 10 is a diagram showing the decision process.

In order to make the phase decision, "+1" and "−1" are respectively added to the output signal of the secondary integration circuit 52. Hence, as shown in FIG. 10, it is possible to accurately determine whether the phase errors in the timing signal existing in the range between −1 and +1 respectively advance or delay.

The frequency dividing ratio of the 1/n counter 54 is changed in response to the output signals of the polarity decision units 53b and 53d. Thereby, the 8000 Hz internal timing signal synchronized with the extracted timing signal can be generated. The internal timing signal is applied to the A/D converter 41, which samples the analog signal in synchronism with the timing signal contained in the received signal. Hence, the main channel system 200 can reproduce the original transmission data. The sum of the output signals of the polarity decision units 53b and 53d is applied to the delay element 52b, and the value of the tap T is reset.

Since the timing component is extracted from the signal transmitted via the secondary channel, it is possible to use the roll-off filter having a roll-off rate of 4% and increase the transmission speed of the main channel to 2000 bauds.

Figure 11:
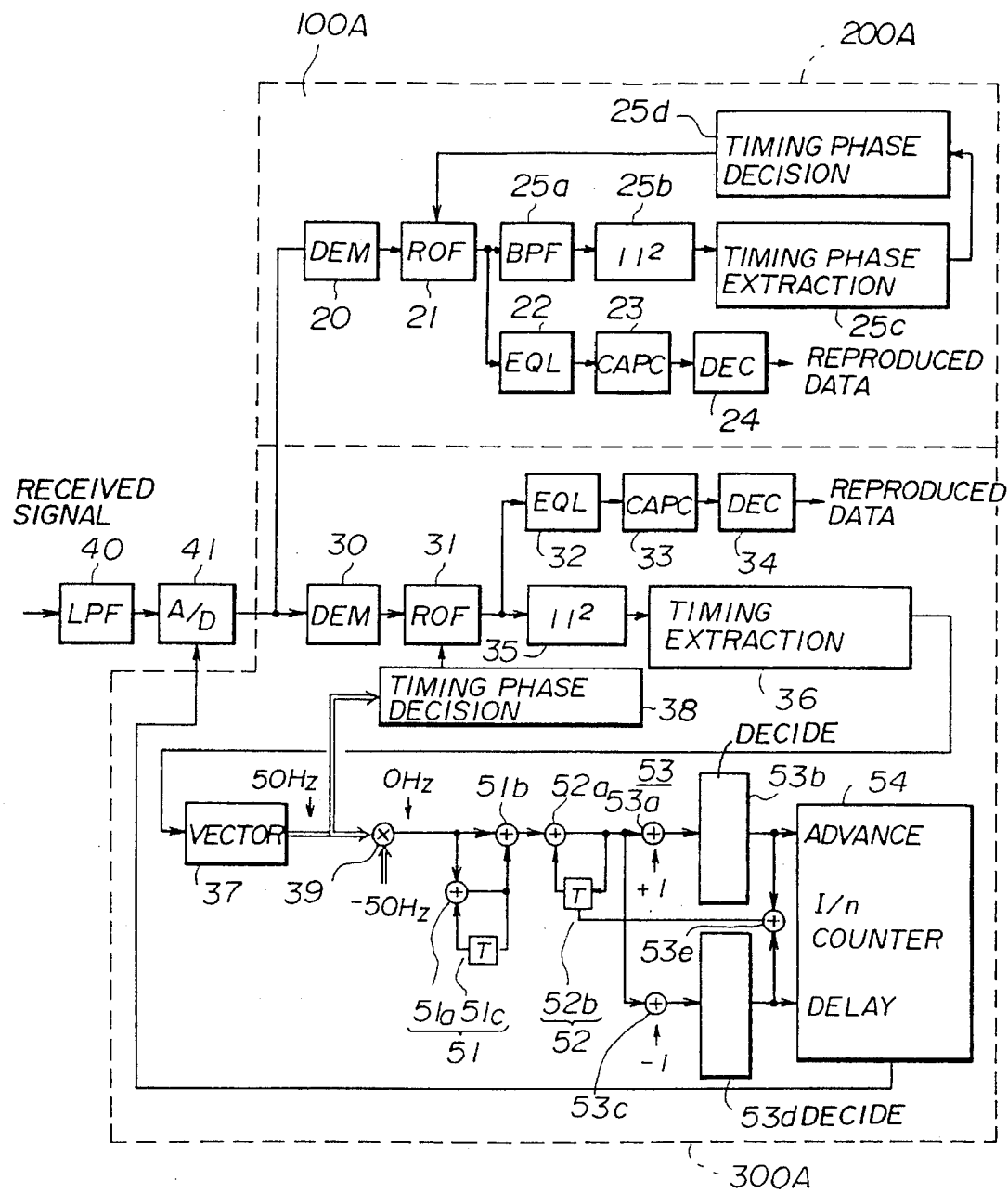
FIG. 11 is a block diagram of a second embodiment of the present invention.

A description will now be given of a second embodiment of the present invention with reference to FIG. 11, in which parts that are the same as parts shown in the previously described figures are given the same reference numbers. The second embodiment comprises the low-pass filter 40, the A/D converter 41 and a processor 100A, such as a digital signal processor.

The second embodiment of the present invention differs from the first embodiment thereof except for the following. That is, the 50 Hz timing signal from the vector conversion unit 37 is multiplied by a −50 Hz timing signal by the multiplier 39 in a secondary channel system 300A. With this arrangement, the zero-point extractor 50 used in the first embodiment can be omitted. Further, the sampling frequency of the A/D converter 41 is equal to the baud rate of the main channel (2000 bauds).

Figure 12A:
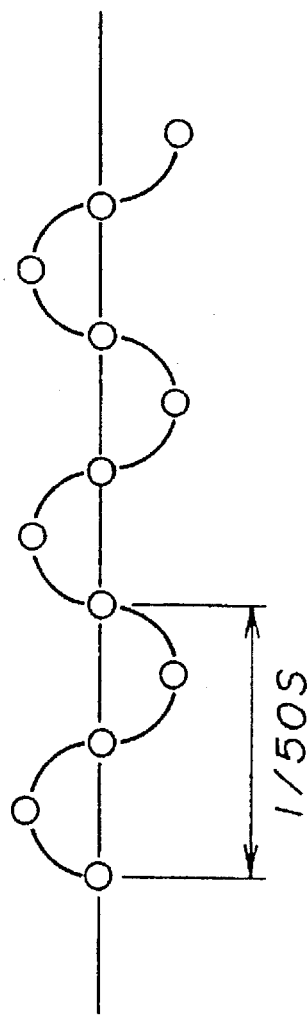
Figure 12B:
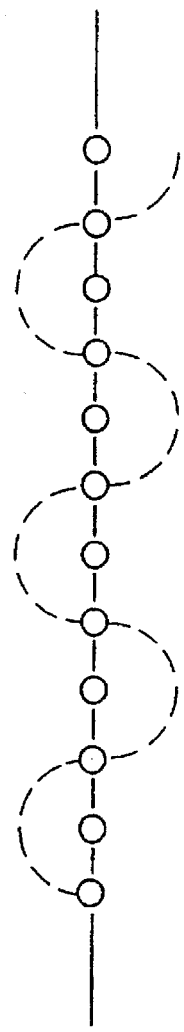
Figure 12C:
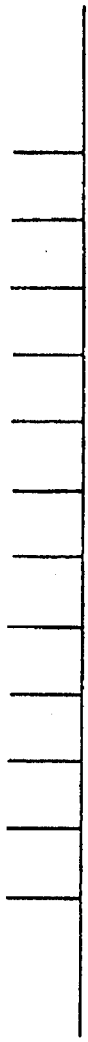

Referring to FIG. 12, the 50 Hz timing signal from the vector conversion unit 37 shown in (A) of FIG. 12 is converted into a DC signal shown in (B) thereof by the multiplier 39. The DC signal includes phase error data every 50 μs (2000 Hz). Hence, the zero-point extractor 50 is not needed, and the load on the processor 100A is reduced. (C) of FIG. 12 shows the sampling clock signal used in the A/D converter 41.

According to the second embodiment of the present invention, phase error data shown in FIG. 13 is obtained with respect to the 50 Hz timing signals shown in (A) of FIG. 9.

FIG. 14 is a variation of the first embodiment of the present invention. The 50 Hz timing signal from the vector conversion unit 37 is applied to the zero-point extractor 50, which extracts the 50 Hz timing signal every 1/50 sec. The output signal of the zero-point extractor 50 has a DC signal and is multiplied by a +2000 Hz signal by means of the multiplier 39.

FIG. 15 shows an essential part of a host device to which the data transmission device is coupled via a network. Transmitters 74 and 75 respectively receive pieces of transmission data SD1 and SD2 to be transmitted via the secondary and main channels. Each of the transmitters 74 and 75 has the modulation and roll-off filtering function. A master clock generator 71 generates a master clock. A 1/n frequency divider 72 divides the master clock by n, and thereby generates a clock signal having a transmission speed of 50 bauds. The transmitter 74 operates in synchronism with the clock signal from the 1/n frequency divider 72. A 1/m frequency divider 73 divides the master clock by m, and thereby generates a clock signal having a transmission speed of 2000 bauds. The transmitter 75 operates in synchronism with the clock signal from the 1/m frequency divider 73. An adder 76 adds the output signals of the transmitters 74 and 75 to each other, and outputs the transmission signal to an analog transmission line.

The present invention is not limited to the specifically disclosed embodiments, and variations and modifications may be made without departing from the scope of the present invention. The transmission speeds of the main and secondary channels are not limited to 2000 bauds and 50 bauds, respectively. The frequency to be added to the vector signal is not limited to 2000 Hz, 0 Hz and −50 Hz.

What is claimed is:

1. A timing generation device of a data transmission device coupled to a transmission line having a main channel and a secondary channel, the main channel having a data transmission speed higher than that of the secondary channel, said data transmission device including a main channel system and a secondary channel system each including a channel reproduction system, said timing generation device comprising:

A/D conversion means receiving an analog signal from said transmission line and converting the analog signal into a digital signal and applying said digital signal to said channel reproduction system of each of said main channel system and said secondary channel system;

extracting means, coupled to said channel reproduction system of said secondary channel system, for extracting a timing signal component from a signal transmitted via the secondary channel; and signal generating means, coupled to said extracting means, for receiving said timing signal component therefrom and generating an internal timing signal in synchronism with the timing signal component, said internal timing signal being applied to said A/D conversion means to apply said internal timing signal to said channel reproduction system of said main channel system to thereby control speed of data transmission via the main channel system.

2. The timing generation device as claimed in claim 1, wherein said signal generating means includes converting means, coupled to said extracting means, for converting the timing signal component into a frequency-shifted timing signal component having a frequency corresponding to the transmission speed of the main channel, and synchronizing means for synchronizing said timing signal component with the frequency-shifted timing signal component.

3. The timing generation device as claimed in claim 2, wherein the frequency-shifted timing signal component is a DC signal.

4. The timing generation device as claimed in claim 1, wherein the transmission speed of the main channel is an integer multiple of the transmission speed of the secondary channel.

5. A data transmission device coupled to a transmission line having a main channel and a secondary channel, the main channel having a data transmission speed higher than that of the secondary channel, said data transmission device comprising:

A/D conversion means for converting an analog signal received via the transmission line into a digital signal at a variable sampling frequency;

a main channel reproducing system which is connected to said A/D conversion means and reproduces transmission data transmitted via the main channel from the digital signal;

a secondary channel reproducing system which is connected to said A/D conversion means and reproduces control data transferred via the secondary channel from the digital signal; and a timing generation device comprising:

first means, coupled to said secondary channel reproducing system, for extracting a timing signal component from a signal transmitted via the secondary channel; and second means, coupled to said first means, for receiving said timing signal component therefrom and generating an internal timing signal in synchronism with the timing signal component, said internal timing signal being applied to said A/D conversion means to control the variable sampling frequency and thereby control the transmission speed of data reproduced in said main channel reproducing system.

6. The data transmission device as claimed in claim 5, wherein said second means includes converting means, coupled to said first means, for converting the timing signal component into a frequency-shifted timing signal component having a frequency corresponding to the transmission speed of the main channel, and synchronizing means for synchronizing said internal timing signal component with the frequency-shifted timing signal component.

7. The data transmission device as claimed in claim 6, wherein the frequency-shifted timing signal component is a DC signal.

8. The data transmission device as claimed in claim 5, wherein said second means comprises:

vector conversion means, coupled to said first means, for generating a vector signal including a real component and an imaginary component from the timing signal component from said first means;

frequency conversion means, coupled to said vector conversion means, for generating a frequency-shifted timing signal component from the vector signal, said frequency-shifted timing signal component having a frequency corresponding to the transmission speed of the main channel;

phase error detecting means, coupled to said frequency conversion means, for detecting a phase error in the timing signal component from the frequency-shifted timing signal component; and counter means for generating said internal timing signal having a variable frequency controlled on the basis of the phase error detected by said phase error detecting means.

9. The data transmission device as claimed in claim 8, wherein said frequency conversion means comprises a multiplier multiplying the vector signal by a reference frequency signal so that the frequency-shifted timing signal component has the frequency corresponding to the transmission speed of the main channel.

10. The data transmission device as claimed in claim 8, wherein said phase error detection means comprises:

zero-point extracting means, coupled to said frequency conversion means, for sampling the frequency-shifted timing signal component at the frequency corresponding to the transmission speed of the main channel; and decision means, coupled to said zero-point extracting means, for identifying the phase error from the sampled frequency-shifted timing signal component from said zero-point extracting means.

11. The data transmission device as claimed in claim 5, wherein said second means comprises:

vector conversion means, coupled to said first means, for generating a vector signal including a real component and an imaginary component from the timing signal component from said first means;

frequency conversion means, coupled to said vector conversion means, for generating a frequency-shifted timing signal component from the vector signal, wherein said frequency-shifted timing signal component is a DC signal;

phase error detecting means, coupled to said frequency conversion means, for detecting a phase error in the timing signal component from the DC signal; and counter means for generating said internal timing signal having a variable frequency controlled on the basis of the phase error detected by said phase error detecting means.

12. The data transmission device as claimed in claim 11, wherein said frequency conversion means comprises a multiplier multiplying the vector signal by a reference frequency signal so that the frequency-shifted timing signal component is the DC signal.

13. The data transmission device as claimed in claim 11, wherein said phase error detection means comprises:

zero-point extracting means, coupled to said frequency conversion means, for sampling the frequency-shifted timing signal component at the frequency corresponding to the transmission speed of the main channel; and decision means, coupled to said zero-point extracting means, for identifying the phase error from the sampled frequency-shifted timing signal component from said zero-point extracting means.

14. The data transmission device as claimed in claim 5, wherein said second means comprises:

vector conversion means, coupled to said first means, for generating a vector signal including a real component and an imaginary component from the timing signal component from said first means;

frequency conversion means, coupled to said vector conversion means, for generating a frequency-shifted timing signal component from the vector signal wherein said frequency-shifted timing signal is a DC signal, phase error detecting means, coupled to said frequency conversion means, for detecting a phase error in the timing signal component from the DC signal and for generating the DC signal indicating said phase error; and counter means for generating said internal timing signal having a variable frequency controlled on the basis of the phase error detected by said phase error detecting means.

15. The data transmission device as claimed in claim 14, wherein said frequency conversion means comprises a multiplier multiplying the vector signal by a reference frequency signal so that said DC signal is obtained.

16. The data transmission device as claimed in claim 15, wherein said reference frequency signal has a frequency corresponding to the transmission speed of the main channel.

17. The data transmission device as claimed in claim 5, wherein the transmission speed of the main channel is an integer multiple of the transmission speed of the secondary channel.

* * * * *